(12) United States Patent
Baeuerle et al.

(10) Patent No.: US 10,599,650 B2
(45) Date of Patent: Mar. 24, 2020

(54) ENHANCEMENTS FOR FORWARD JOINS EXPRESSING RELATIONSHIPS

(71) Applicant: SAP SE, Walldorf (DE)

(72) Inventors: Stefan Baeuerle, Rauenberg (DE); Bjoern Mielenhausen, Plankstadt (DE); Daniel Hutzel, Karlsruhe (DE); Ki Hong Kim, Seoul (KR); Di Wu, Seoul (KR); Long Zhang, Xi'an (CN)

(73) Assignee: SAP SE, Walldorf (DE)

( * ) Notice: Subject to any disclaimer, the term of this patent is extended or adjusted under 35 U.S.C. 154(b) by 434 days.

(21) Appl. No.: 15/208,736

(22) Filed: Jul. 13, 2016

(65) Prior Publication Data
US 2018/0018368 A1 Jan. 18, 2018

(51) Int. Cl.
*G06F 7/00* (2006.01)
*G06F 17/30* (2006.01)
*G06F 16/2453* (2019.01)
*G06F 16/22* (2019.01)

(52) U.S. Cl.
CPC ........ *G06F 16/24544* (2019.01); *G06F 16/22* (2019.01); *G06F 16/24535* (2019.01)

(58) Field of Classification Search
CPC ......... G06F 17/30466; G06F 17/30312; G06F 17/30451
USPC ...................................................... 707/714
See application file for complete search history.

(56) References Cited

U.S. PATENT DOCUMENTS

| | | | | |
|---|---|---|---|---|
| 5,873,093 A * | 2/1999 | Williamson | ........ | G06F 16/2438 |
| 7,437,676 B1 * | 10/2008 | Magdum | ............... | H04L 41/024 715/735 |
| 7,653,665 B1 * | 1/2010 | Stefani | ................ | G06F 16/2343 714/19 |
| 7,702,616 B1 * | 4/2010 | Li | ..................... | G06F 16/24544 707/999.002 |
| 2003/0212705 A1 * | 11/2003 | Williamson | .......... | G06F 16/289 |
| 2006/0106766 A1 * | 5/2006 | Bloom | .............. | G06F 16/24542 |
| 2006/0168577 A1 * | 7/2006 | Melo | ........................ | G06F 8/71 717/168 |
| 2007/0192337 A1 * | 8/2007 | Chandrasekar Iyer | ..................... | G06F 16/24542 |
| 2008/0005719 A1 * | 1/2008 | Morris | ...................... | G06F 8/41 717/100 |
| 2009/0144299 A1 * | 6/2009 | Ledwith | ................. | G06F 16/221 |
| 2012/0136868 A1 * | 5/2012 | Hammerschmidt | .. | G06F 16/284 707/741 |
| 2013/0159259 A1 * | 6/2013 | Hobbs | .................... | G06Q 10/10 707/690 |
| 2015/0074139 A1 * | 3/2015 | Falter | .................... | G06F 16/245 707/769 |
| 2015/0074140 A1 * | 3/2015 | Hutzel | .................. | G06F 16/248 707/769 |
| 2016/0275089 A1 * | 9/2016 | Soundararajan | ........ | G06F 16/18 |

* cited by examiner

*Primary Examiner* — Binh V Ho
(74) *Attorney, Agent, or Firm* — Buckley, Maschoff & Talwalkar LLC

(57) ABSTRACT

A system, medium, and method to define a database table and view based on a database model using a database language statement, the database language statement including a statement to create the table and a forward-declared JOIN statement that names the table and view, respectively and includes information regarding a relationship between at least two entities of the database.

12 Claims, 5 Drawing Sheets

500

```
CREATE TABLE Employees ( ...
    ID Integer primary key,
    name varchar(111),                 ◄── 505
    address_id Integer
) WITH ASSOCIATIONS (
    ONE TO MANY JOIN Addresses as addresses on addresses.owner_id = ID,
    ONE TO ONE JOIN Addresses as address on address.ID = address_id
);

CREATE TABLE Addresses (
    ID Integer primary key,
    streetAddress varchar(222),        ◄── 510
    zipCode varchar(11),
    town_id Integer,
    owner_id Integer
) WITH ASSOCIATIONS (
    JOIN Towns as town on town.ID = town_id
);

CREATE TABLE Towns ( ...
    ID Integer primary key,
    name varchar(111),                 ◄── 515
    country_code varchar(3)
) WITH ASSOCIATIONS (
    JOIN Countries as country on country.code = country_code
);

CREATE TABLE Countries { ...
    code varchar(3) primary key,       ◄── 520
    name varchar(111),
```

100

| ID | NAME | ADDRESS |
|---|---|---|
|  |  |  |
|  |  |  |
|  |  |  |
|  |  |  |

| ID | STREETADDRESS | ZIPCODE | TOWN_ID | OWNER_ID |
|---|---|---|---|---|
|  |  |  |  |  |
|  |  |  |  |  |
|  |  |  |  |  |
|  |  |  |  |  |

| ID | NAME | COUNTRY_CODE |
|---|---|---|
|  |  |  |
|  |  |  |
|  |  |  |
|  |  |  |

| CODE | NAME |
|---|---|
|  |  |
|  |  |
|  |  |
|  |  |

```
CREATE TABLE Employees ( ...
    ID Integer primary key,
    name varchar(111),                    ← 505
    address_id Integer
) WITH ASSOCIATIONS (
    ONE TO MANY JOIN Addresses as addresses on addresses.owner_id = ID,
    ONE TO ONE JOIN Addresses as address on address.ID = address_id
);

CREATE TABLE Addresses (
    ID Integer primary key,
    streetAddress varchar(222),
    zipCode varchar(11),                  ← 510
    town_id Integer,
    owner_id Integer
) WITH ASSOCIATIONS (
    JOIN Towns as town on town.ID = town_id
);

CREATE TABLE Towns ( ...
    ID Integer primary key,
    name varchar(111),                    ← 515
    country_code varchar(3)
) WITH ASSOCIATIONS (
    JOIN Countries as country on country.code = country_code
);

CREATE TABLE Countries { ...
    code varchar(3) primary key,          ← 520
    name varchar(111),
```

FIG. 5

ENHANCEMENTS FOR FORWARD JOINS EXPRESSING RELATIONSHIPS

BACKGROUND

A number of relational database systems and applications use a database language such as Structured Query Language (SQL) and versions thereof to define, manipulate, and query data in the database. While standard SQL may be well-suited of searching a relational database, it can be limited regarding expressing relationships in data models. It is possible to express some constraints on the data (i.e., relationships) using, for example, foreign key constraints. However, such mechanism may primarily provide consistency checking for the data and does not fully express relationships on a contextual level.

In some aspects, including an applications and usage perspective, data objects relating to real-world operations may typically comprise numerous objects (e.g., documents, reports, contracts, invoices, orders, etc.) that are represented and ultimately stored in tables in a database. For example, a data object such as an "order" document may include a number of line items relating to a plurality of parties (e.g., a buyer, a seller, a supplier, etc.). For this "order", there can be relationships between the different parties. These relationships may be expressed at a data consumer end (e.g., via a user interface) and/or on a logical level but such relationships are not typically expressed or defined in the database level. While some links between data items (i.e., fields) may be indicated in a limited manner in a relational database using primary keys that define some foreign key constraint, the database model itself does not express the semantic relationships.

It is the case that most conventional search applications, devices, and services rely on explicit, database-oriented operators that recite direct and literal connections between query search terms for the execution of a query based thereon. In some contexts, there may exist a desire to precisely define relationships between data items in a relational database in an efficient manner.

BRIEF DESCRIPTION OF THE DRAWINGS

FIG. 1 is an illustrative block diagram of a database table, according to some embodiments;

FIG. 2 is an illustrative block diagram of a database table, according to some embodiments;

FIG. 3 is an illustrative block diagram of a database table, according to some embodiments;

FIG. 4 is an illustrative block diagram of a database table, according to some embodiments;

FIG. 5 is an illustrative block diagram of a database table, according to some embodiments;

DETAILED DESCRIPTION

Figure 6:
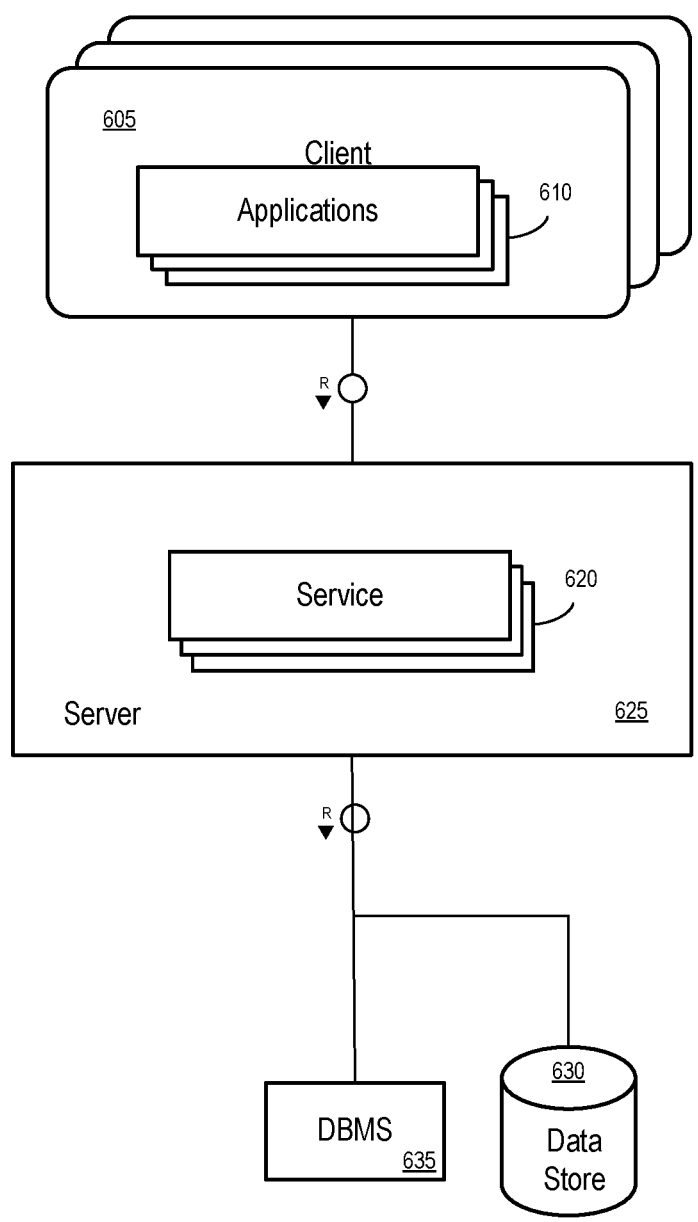
FIG. 6 is an illustrative block diagram of a system architecture for one example embodiment.

The following description is provided to enable any person in the art to make and use the described embodiments. Various modifications, however, will remain readily apparent to those in the art.

In some aspects, a query of a database using a database language such as SQL can be accomplished using a SQL statement or views on SQL statements (i.e., a result of a SQL statement) that use JOINs. The JOINs, either INNER JOINs or OUTER JOINs, can be used to reflect a relationship between different tables in the database, from a semantic point of view.

From the view of executable applications from an implementation or real-world perspective, applications might use entity relationship models to capture and express the relationships (i.e., associations) between different entities.

In some aspects herein, the present disclosure relates to associations defined on a data model level that may be used to navigate from one entity (e.g., database table or database view) to another entity (e.g., database table or database view) of the database. In some embodiments, SQL (or other database language) may be enhanced with mechanisms to declare associations as part of the data model by using "associations" disclosed herein.

In some instances, the associations may include one or more database tables and database views. In some aspects, the declared associations include metadata information regarding the declared (i.e., named) associations between the database tables and database views. In some embodiments, the metadata information included in the defining or creating of database tables, views, or other entities having an "association" as disclosed herein may be used in formulating and executing queries. For example, the metadata information may be used to formulate path expressions that follow a named association(s) to navigate from one table or view to another table or view. In some regards, some path expressions may reflect or correspond to the behavior of an executable application, service, or system, from, for example, an application developer's perspective.

In some regards, and from an entity-relationship (ER) model point of view, relationships between the different entities of the ER model can be viewed as forward-declared JOINs. In some instances herein, the term "forward-declared JOIN" herein may also be used interchangeably with the term "Association", unless stated otherwise. As used herein, a forward-declared JOIN is not only a mechanism to execute a query or build a view but also includes metadata or meta information regarding a data model (i.e., relationships between data model entities) and defines a name for the Association defined thereby. The Association (i.e., forward-declared JOIN) declarations to tables and views disclosed herein (below) can be used in path expressions in a query or other consuming views. In some embodiments, the Association (i.e., forward-declared JOINs) declarations disclosed herein (below) can be used in path expressions in a query or other consuming views without a need to declare the Associations in the query or view in which they are used.

Figure 4:
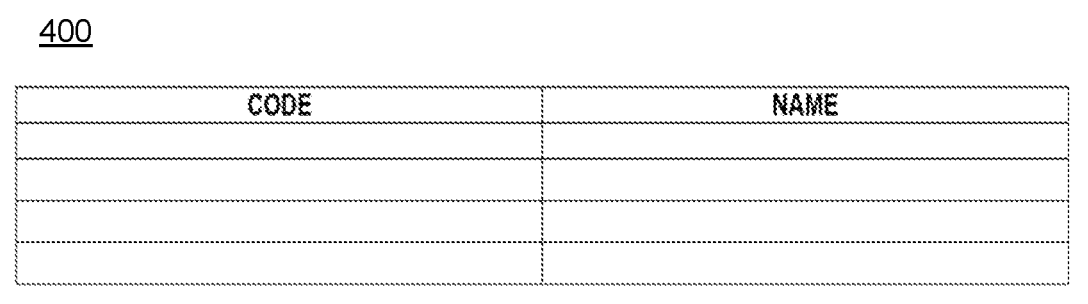

In some aspects of the present disclosure, reference may be made to a data model. In an effort to illustrate various aspects herein, a sample data model is presented as FIGS. 1-4.

In some aspects, the present disclosure includes a process to define a table having Associations as forward-declared JOINs. In some embodiments, a table can be created that includes an Association (i.e., forward-declared JOIN) declaration. An example of the creation of a table (e.g., Employees) is illustrated in the following listing of SQL statements (example 1).

```
CREATE TABLE Employees (
name varchar(77), address_id Integer // foreign key to Address table
) WITH ASSOCIATIONS ( // forward-declared joins...
    JOIN Addresses as address on address.id = address_id
);
```

Example 1 includes a CREATE TABLE statement with the herein disclosed "WITH ASSOCIATION" clause that defines relationships for the Employees table being created. Logically, example 1 creates a table, Employees, with associations as indicated by the forward-declared JOINs within the following parenthesis. According to example 1, a table Employees is created with associations defined by the forward-declared JOIN statement to combine the table Employees with a table Addresses under the alias of address on the condition that the "id" in the address table matches the "address_id" in the Employees table. FIG. 1 is an illustrative example of a table 100, Employees, created in accordance with example 1 and some embodiments herein. As shown in FIGS. 1 and 2 and tables 100 and 200, respectively, a number of fields in the table are shown that are referenced in the CREATE TABLE statement of example 1.

Example 1 illustrates how the Association and the JOIN is declared at the table. That is, the relationship between the tables Employees and Addresses is defined in the data model.

In accordance with some aspects herein, a query can be formulated using the table alias from the forward-declared JOIN (i.e., Association). Such a query is illustrated by the following example query statement.

SELECT name, address.zipCode from Employees;

A query of the Employee table can be accomplished using a sub-statement as shown above. The example SELECT statement reads as a natural query statement. As this example query statement illustrates, the "address.zipCode" term in the SELECT statement is a logical path expression on the entity relationship model that uses the "address" alias introduced in the Association's information metadata created with the table Employees. The "address" alias references/points (i.e., navigates) to the Addresses table, from which the zipCode is obtained.

The use of the term "address.zipCode" term in the SELECT statement provides a mechanism for a computer processing system, device, application, or service to use metadata information that is declared at the creation of the table (i.e., Employee table) to expand the SELECT statement so that it can be expressed as multiple, simple imperative SQL statements with a LEFT OUTER JOIN. This expansion or unfolding of the concise SELECT SELECT statement above can be expressed as follows:

SELECT Employees.name, address.zipCode from Employees
LEFT OUTER JOIN Addresses as address on address.id=address_id The listing of unfolded SQL statements above can be performed by an executable application, service, system, or device, including a backend system that executes queries for one or more nodes of a database management system.

In some embodiments, a table may be created including Association(s) as illustrated in example 1 above. The table created thereby may then be used in a concise query statement that references the Association(s) without explicitly stating the relationships defined by the Association, wherein an execution of the query may include a system, device, service, and application unfolding the concise query statement into one or more simple SQL statements. In some aspects, the metadata information included in the data model by virtue of the declared Association(s) provides a mechanism for the formulating of the query in a concise and compact manner (e.g., "address.zipCode") that may correspond to a logical understanding of the data model entities without a need to have to explicitly define the relationships in the concise query statement since the relationships are already embodied at the table level. Therefore, in some embodiments it is suffice to specify or reference the table including Associations in the query statement and not include additional JOINs that implicitly capture the relationship(s) between the data entities since the table including Associations is defined to include meta information that expresses relationships(s) between the data entities.

In this manner, a system, device, service, and application may, in some embodiments, execute the simple SQL statements in a straight forward fashion, consistent in some regards with known query execution processes. That is, in some embodiments, a table created or generated including forward-declared JOINs (i.e., Associations) to express relationships between database entities in the created table in accordance with some aspects herein may be used in a query that is ultimately executed by a system, service, or device using standard SQL statements and operations.

In accordance with some aspects and features herein, a syntax for a database language (e.g., SQL) to create a table having ford-declared JOINs or Associations may adhere to the following example:

CREATE_TABLE+=[WITH ASSOCIATIONS "("ForwardDeclaredJoins")"]

ForwardDeclaredJoins=<single JOIN clause>[",", ForwardDeclaredJoins]

In some aspects, a database catalog for a database including tables created with forward-declared JOINs or Associations as disclosed herein may register the forward-declared JOINs with the given table aliases (e.g., address in the above example 1). The catalog may include the metadata in which the definitions of database objects, such as but not limited tables and are stored. In some embodiments herein, the catalog may obey a number of rules, including unqualified column names in "on" conditions are always resolved in the left-hand side source table and prefixed accordingly in the unfolded query (i.e., Employees in example 1 above). All column names from a joined table are prefixed with the respective table alias, e.g. "address.id" in example 1. In this manner, forward-declared JOINs herein do not expand the inbound set of addressable column names, to the superset of names from all joined tables (as opposed to JOINs in queries).

For the catalog, forward-declared joins do not specify a join type but leave that to the unfolded queries (described in greater detail hereinbelow). In some embodiments, all native SQL syntax, including vendor-specific extensions for declaring joins, are allowed (e.g. the optional use of HANA-specific ONE TO ONE or similar, as provided by SAP).

For a database catalog in accordance with some aspects herein, the WITH ASSOCIATIONS clause only accepts a comma-separated list of individual join statements, while in queries joins are usually chained with whitespaces. Also, a column definition with the same name as an association is an error.

In accordance with some embodiments herein, forward-declared JOINs or Associations as disclosed herein can be defined for database Views. In some instances, a View on a data model may be desired for a specific consumption use-case. Similar to the Associations introduced above regarding tables, Views can be created to define Associations between database entities. An example of the creation of a View (e.g., EmployeesView) is illustrated in the following listing of SQL statements (example 2).

```
CREATE VIEW EmployeesView as SELECT name, address.country_id
from Employees
//> use the association address in to read joined country_id
WITH ASSOCIATIONS (
   JOIN Countries as country on country.id = country_id,
//> new association in view
);
```

Example 2 includes a CREATE VIEW statement with the herein disclosed "WITH ASSOCIATION" clause that defines relationships for the EmployeesView view being created. Logically, example 2 creates a view, EmployeesView, with associations as indicated by the forward-declared JOINs within the parenthesis following "WITH ASSOCIATION". According to example 2, a view named EmployeesView is created that selects some projection from the Employees table. The EmployeesView view introduces, via the "WITH ASSOCIATION" clause a JOIN to a Countries table with the alias country based on the country key information using the address table (i.e., country_id is the foreign key).

Example 2 above refers to a sample data model, including tables 100, 200, and 400 depicted in FIGS. 1, 2, and 4, respectively.

The behavior of the View (i.e., EmployeesView) created in example 2 illustrates how the Associations and the JOIN are declared at the View, and in some aspects is similar to that of the table created above with respect to example 1 herein. That is, the relationship between the tables Employees, Addresses, and Countries is defined in the data model by the View defined and created by the CREATE VIEW database language statements of example 2.

In accordance with some aspects herein, a query can be formulated using the created View including associations as defined on the data model. A query can thus be generated that uses the View including Associations (i.e., forward-declared JOINs) to select name and country.name from the newly created EmployeesView View. Such a query is illustrated by the following example query statement.

SELECT name, country.name from EmployeesView;
   // queries using the propagated and new associations The above query is compact and concise, leveraging the alias country and the relationships defined in the created EmployeesView View. Similar to tables disclosed created using Associations, the query using the View having declared JOINs can be expanded or unfolded by a query processor system, service, device, or application (e.g., running on a backend server). The above query can unfold to:

SELECT name, country.name from EmployeesView
      LEFT OUTER JOIN Countries as country on country.id=country_id;

In accordance with some aspects herein, a syntax for a database language (e.g., SQL) to create a View having forward-declared JOINs or Associations may adhere to the following example:

CREATE_VIEW+=[WITH ASSOCIATIONS "("ForwardDeclaredJoins")"]

In some instances, "Countries" in example 2 need not be a table but could itself be another View. That is, the discloses Associations may be used to define relationships between tables, views, and combination thereof.

In some embodiments, the syntax extension for declaring new associations (i.e., Associations/forward-declared JOINs) for Views (i.e., CREATE VIEW) is similar to the extension of CREATE TABLE statement disclosed herein. It is noted that for Views, the projection has to include the requisite foreign keys for all newly declared associations. Also, within the "on" conditions of forward-declared JOINs in Views, one can only refer to columns in the projection, as shown below:

```
CREATE VIEW v1 as SELECT name, address from Employees; //> error:
missing fk
CREATE VIEW v2 as SELECT name, address, address_id from
Employees;
//> ok
```

It is noted that query clauses in SQL are executed in the following order: FROM, JOINs, WHERE, GROUP BY, HAVING, SELECT, ORDER BY—for Views, WITH ASSOCIATIONS coming last, after SELECT. Accordingly, the rules above apply for Views.

In some aspects of the present disclosure, forward-declared JOINs can be leveraged in SQL's SELECT statement by enhanced path expressions. As a result, projections can be expressed by "navigating" through entity-relationship graphs (similar to XPath for XML documents) as discussed above with regards to example 1. The enhanced path expressions can have the effect of simplifying queries and view definitions, as demonstrated by examples 1 and 2 hereinabove including the compact SQL query statements using the defined table (e.g., Employees) and view (e.g., EmployeesView). To leverage SQL SELECT statements in accordance with some aspects herein, SQL (or other database language) can be extended by two concepts. Those concepts include (1) Path Expressions to "navigate" through entity-relationship graphs and (2) Infix Filters in path expressions to narrow join conditions.

Given the following (abbreviated) syntax for standard SQL SELECT statements:

```
query = SELECT projection FROM fromClause [ WHERE predicates ]
...
projection = [ projection "," ] ( "*" | element | expr ) [[ as ] elementAlias
] element = [ tableAlias "." ] elementName
fromClause = sourceEntity [[ as ] tableAlias ] ( joinClause )*
sourceEntity = [ schemaName "." ] entityName
joinClause = [ joinType ] JOIN sourceEntity [[ as ] tableAlias ] ON
predicates
joinType = ( LEFT | RIGHT [ OUTER ] ) | INNER
elementName, elementAlias, entityName, tableAlias = Identifier
```

The SQL statements can be enhanced in accordance with the following to use Path Expressions in queries (i.e., SELECT statements):

```
PathExpression = [ PathExpression "." ] elementName
   element = PathExpression    -- in select, where, ... clauses
   InfixFilter = "[" predicates "]"
   PathExpression += [ InfixFilter ]
```

In accordance with the foregoing discussion of path expressions to extend SQL SELECT statements, an example (i.e., example 3) is provided below.

```
SELECT *, address.zipCode, address.town.name as homwtown from
Employees;
//( compact, conse SQL statement based on the sample data model of
FIGS. 1 - 4)
// that would unfold to:
SELECT Employees.*, address.zipCode, town.name as hometown from
Employees
```

-continued

```
LEFT JOIN Addresses address ON address.ID = Employees.address_id
LEFT JOIN Towns town ON town.ID = address.town_id
```

The corresponding syntax for Path Expressions herein is defined by the following:

```
// element = [ tableAlias "." ] elementName    -- standard SQL
element = PathExpression          -- in select, where, group by, ... clauses
PathExpression = [ PathExpression "." ] elementName
```

In accordance with aspects herein, Path Expressions are exactly those paths seen in the projection, for example, "address.zipCode" and "address.town.home". Upon execution of queries using the SQL SELECT statements including Path Expressions herein, the query processors behind the scenes (e.g., on a backend server) make use of the aliasing mechanism and the alias prefixing of some identifiers from standard SQL. In this manner, the Path Expressions herein can be translated to unfold the SQL statements from their compact form using Path Expressions to the unfolded or expanded form as shown in the foregoing examples.

In some regards, Path Expressions can be used to formulate queries along logical relational models. Path Expression may include any number of steps, without limit and loss of generality, to adequately define and express the desired results of a query. As such, Path Expressions may be used to navigate along many different JOINs (notwithstanding the simplified examples explicitly disclosed herein) to reach all of the elements that may be required by a particular query.

In accordance with some aspects herein, each prefix name in a Path Expression is expected to resolve to an association (i.e., a table alias from a forward-declared join) and unfolds to real JOINs as follows. (1) Table aliases from forward-declared JOINs can be used in queries as if a corresponding JOIN would be present in the query's FROM clause. For each usage, a corresponding JOIN is implicitly added. Multiple usages of the same alias collapse to one join and no join is added if an alias from a forward-declared JOIN is not used. (2) Associations used in Path Expressions in SELECT, WHERE, GROUP BY, HSVING and ORDER BY clauses always unfold to LEFT OUTER JOINS. (3) When having multiple choices for path resolution, the priority is to resolve the name into a format with fewer associations. When an Association name coincides with a database/schema/table name, a SQL user needs to take special care. For example: select A.ID from A, B. Here, this statement will be understood to mean select ID column from A table, not the association A in table B. (4) Unqualified column names, including * in the queries SELECT clause are resolved only from the tables/view specified explicitly in the FROM clause, including joined ones (not from implicitly added joins from unfolded associations).

Regarding item (4), it is noted that as opposed to explicit JOINs in queries, Associations herein do not expand the inbound set of addressable column names. This therefor implies that all accesses to a joined table's elements must be qualified with the respective association name in original queries. For example, address.zipCode, address.town . . . in the above example 3.

In some embodiments, a possible implementation of this name resolution rule could be to prefix any unqualified name with the table given in the FROM clause (e.g., Employees.* in the unfolded form of example 3 above. In the case of queries with explicit JOINs, a sub-select is used to apply this same prefixing implementation technique as in the following example (Example 4):

```
SELECT *, name, address.town.name as hometown, birthTown.name
from Employees
    LEFT JOIN Town birthTown ON ... ;
// would unfold to:
SELECT_from.*, _from.name, town.name as hometown from (
    SELECT * from Employees LEFT JOIN Town birthTown ON ...
) as _from
LEFT JOIN Addresses address ON address.ID = Employees.address_id
LEFT JOIN Towns town ON town.ID = address.town_id
```

It is noted that example 4 above is just one possible implementation, where other possible implementations may use other approaches to fulfil or satisfy the name resolution rule introduced above.

Regarding the Infix filters introduced above, it is noted that Infix filters are standard SQL predicates suffixed to individual associations in path expressions to narrow respective JOIN. An example (i.e., example 5) is provided below.

```
SELECT name,
    addresses[kind='home'].town as homeTown,
    addresses[kind='biz'].town as businessTown
from Employees;
// would unfold to:
SELECT name, a1.town as homeTown, a2.town as businessTown from
Employees
LEFT JOIN Addresses a1 ON ( a1.owner=ID ) AND ( a1.kind='home' )
LEFT JOIN Addresses a2 ON ( a2.owner=ID ) AND ( a2.kind='biz' )
```

In some aspects, to filter down to the address association, an Infix filter "[ ]" can be used where "addresses[kind='home'].town" refers to a home address and addresses[kind='biz'].town refers to a business address. The compact statement of example 5 translates into the two LEFT OUTER JOINs in the unfolded statements with and extended AND clause that gets the additional filter in the ON condition.

In some embodiments; the syntax for an Infix filter is specified by:
    InfixFilter="["predicates"]"
    Path Expression+=[InfixFilter]

In some aspects herein, Infix filters unfold to append their predicates to the ON clauses of the associations' JOIN as shown in the example 5 above. Additionally, the following rules apply. (1) The filter predicates are appended in parenthesis with AND; the fix-part on condition also set in parenthesis to accommodate for potential OR in both; (2) Each different infix filter predicate on the same association leads to a new join (i.e. joins a1 and a2 in the examples above); (3) All element names are resolved within the target entity's type structure and are implicitly qualified with the respective target alias upon unfolding (see a1.kind and a2.kind in the unfolded examples above); and (4) Only direct columns of the target alias are allowed; i.e. nested path expressions using associations in the target are not supported.

It is further noted that in some aspects, Infix filters can be used in WHERE clauses of UPDATE and DELETE statements and The right-hand side of assignments in the SET clause UPDATE statements.

Aspects of the processes, systems, and services discussed hereinabove may be implemented through any tangible implementation of one or more of software, firmware, hardware, and combinations thereof.

FIG. 6 is an illustrative block diagram of an architecture or system 600, in one example. System 600 includes one or more client devices 605 running an application 610. Examples of some embodiments of the present disclosure are not limited to the particular architecture 600 shown in FIG. 6.

System 600 includes a service 620 that execute within server 625. Service 620 can receive requests for a service from clients 605 executing applications 610 and reply with responses or results sent to applications 610 based on data stored within data store 630 that is further managed by database management system (DBMS) 635.

Server 625 may include server-side executable instructions (e.g., program instructions such as, for example, compiled code, scripts, etc.) that can provide functionality to applications 610 by providing user interfaces to clients 605, receiving requests from applications 610, retrieving data from data store 630 based on the requests, processing the data received from data store 630 by DBMS 635, storing some of the processed data on data store 630, providing the processed data to applications 610. Services 620 may be made available for execution by server 625 via registration and/or other security and log-in procedures, which may be known in the art.

In one specific example, a client 605 executes an application 610 to present a user interface to a user on a display of client 605. The user enters one or more SQL statement input(s) into the user interface. Application 610 operates to send or transmit the SQL statements to services 620. In some instances, a script, instruction, or command is generated by services 620 based on the SQL statements (i.e., request) including a forward-declared JOIN statement that names a table and view and is forwarded to DBMS 635. The DBMS may execute instructions to generate the table and view in reply to the request. Thereafter, the forward-declared JOIN statements can be used in path expressions in queries and/or consuming views, without a need to declare JOINs in the queries.

Server 625 provides any suitable protocol interfaces through which applications 610 executing on clients 105 may communicate with services 620 executing on application server 625. For example, server 625 may include a HyperText Transfer Protocol (HTTP) interface supporting a transient request/response protocol over Transmission Control Protocol (TCP), and/or a WebSocket interface supporting non-transient full-duplex communications between server 625 and any clients 605 that implement the WebSocket protocol over a single TCP connection.

Data store 630 may comprise any data source or sources that are or become known. Data store 630 may comprise a relational database, a HTML document, an eXtendable Markup Language (XML) document, or any other data storage system storing structured and/or unstructured data files. The data of data store 630 may be distributed among several data sources. Embodiments are not limited to any number or types of data sources.

Data store 630 may implement an "in-memory" database, where a full database stored in volatile (e.g., non-disk-based) memory (e.g., Random Access Memory). The full database may be persisted in and/or backed up to fixed disks (not shown). Embodiments herein are not limited to an in-memory implementation. For example, data may be stored in Random Access Memory (e.g., cache memory for storing recently-used data) and other forms of solid state memory and/or one or more fixed disks (e.g., persistent memory for storing their respective portions of the full database).

Each of clients 605 may include one or more devices executing program instructions of an application 610 for presenting user interfaces to allow user interaction with application server 625. User interfaces (not shown in FIG. 1) of applications 610 may comprise user interfaces suited any interface functions based on the data of data store 630.

Although embodiments have been described with respect to certain contexts, some embodiments may be associated with other types of devices, systems, and configurations, either in part or whole, without any loss of generality.

Figure 7:
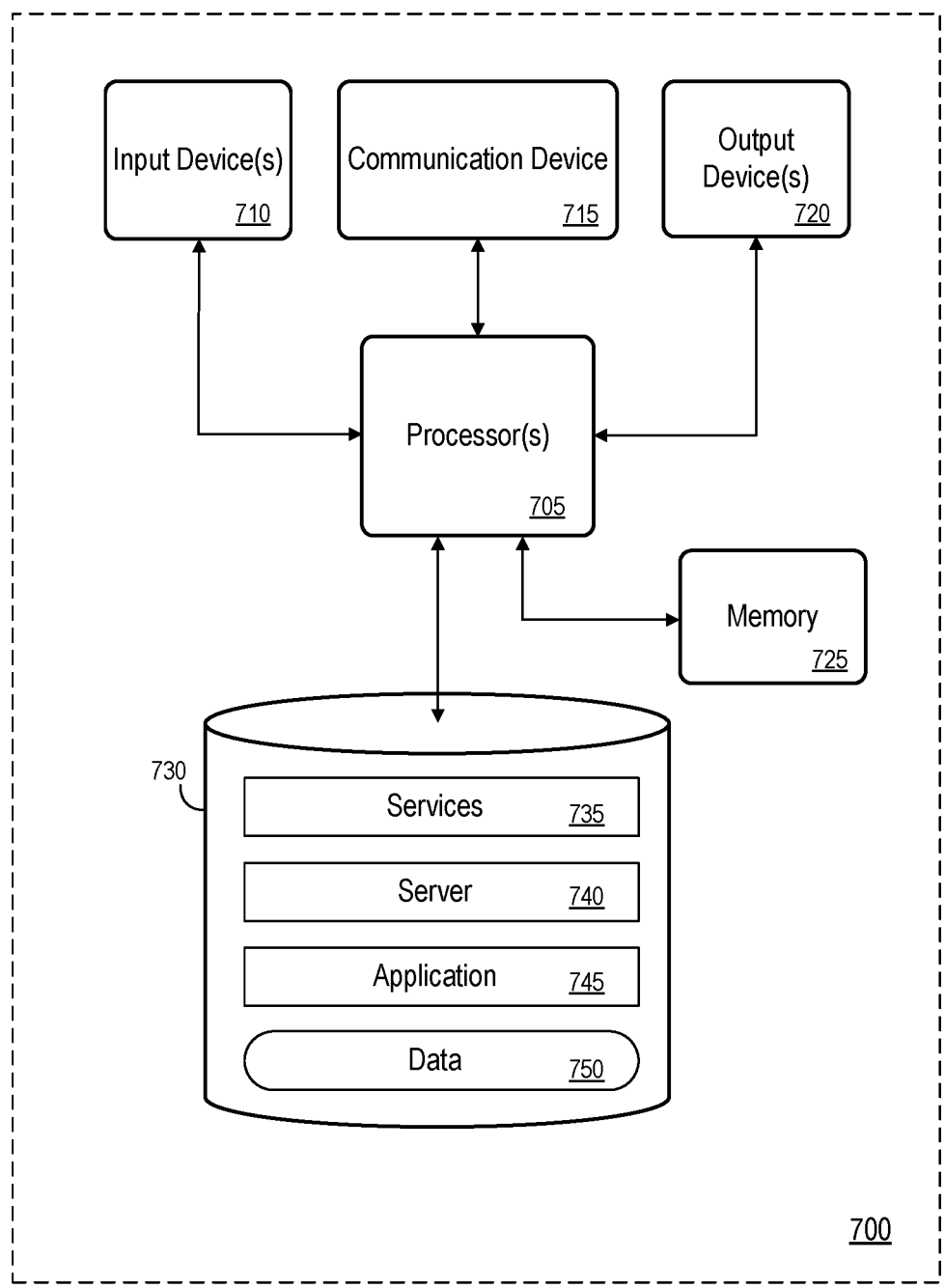
FIG. 7 is a block diagram of an apparatus of one example embodiment.

FIG. 7 is a block diagram of apparatus 700 according to one example of some embodiments. Apparatus 700 may comprise a computing apparatus and may execute program instructions to perform any of the functions described herein. Apparatus 700 may comprise an implementation of server 625, DBMS 635 and data store 630 of FIG. 6 in some embodiments. Apparatus 700 may include other unshown elements according to some embodiments.

Apparatus 700 includes processor 705 operatively coupled to communication device 715, data storage device 730, one or more input devices 710, one or more output devices 720 and memory 725. Communication device 715 may facilitate communication with external devices, such as a reporting client, or a data storage device. Input device(s) 710 may comprise, for example, a keyboard, a keypad, a mouse or other pointing device, a microphone, knob or a switch, an infra-red (IR) port, a docking station, and/or a touch screen. Input device(s) 710 may be used, for example, to enter information into apparatus 700. Output device(s) 720 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), solid state storages device, optical storage devices, Read Only Memory (ROM) devices, Random Access Memory (RAM), Storage Class Memory (SCM) or any other fast-access memory.

Services 735, server 740, and application 745 may comprise program instructions executed by processor 705 to cause apparatus 700 to perform any one or more of the processes described herein. Embodiments are not limited to execution of these processes by a single apparatus.

Data 750 (either cached or a full database) may be stored in volatile memory such as memory 725. Data storage device 730 may also store data and other program code for providing additional functionality and/or which are necessary for operation of apparatus 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

The embodiments described herein are solely for the purpose of illustration. Those in the art will recognize other embodiments which may be practiced with modifications and alterations.

What is claimed is:

1. A computer-implemented method, the method comprising:
   receiving, by a processor, user inputs defining a database table in a relational database using a database language statement, the database language statement including a statement to create the table and a forward-declared JOIN statement that specifies a name for the table and defines, at a level of the table within the table, an association expressing a relationship between the table being created and at least one other entity of the relational database;
   creating, by the processor, the table including the forward-declared JOIN statement in the relational database, the created table including a declaration of metadata that expresses the relationship between the table being created and at least one other database entity of the relational database;
   receiving, by the processor and expressed in the database language, a query statement including a reference to the created table defined to include the association expressing the relationship between the created table and the at least one other database entity, the query statement not explicitly stating the association defined by the forward-declared JOIN statement;
   defining a database view in the relational database, using a second database language statement, the second database language statement including a statement to create the view and a forward-declared JOIN statement that specifies a name for the view and defines an association between the view and at least one other database entity of the relational database; and
   executing, by the processor, the query statement to generate a query result, the query result generated based on the metadata declared at the creation of the table that expresses the relationship between the created table and the at least one other database entity of the relational database.

2. The method of claim 1, wherein the metadata is stored in a catalog of the database.

3. The method of claim 1, wherein the at least one other database entity of the relational database includes a database table.

4. The method of claim 1, wherein the at least one other database entity of the relational database includes at least one of a database table, a database view, and combinations thereof.

5. A system comprising:
   a memory storing processor-executable instructions; and
   a processor to execute the processor-executable instructions to cause the system to:
   receive user inputs to define a database table in a relational database using a database language statement, the database language statement including a statement to create the table and a forward-declared JOIN statement that specifies a name for the table and defines, at a level of the table within the table, an association expressing a relationship between the table being created and at least one other entity of the relational database;
   create the table including the forward-declared JOIN statement in the relational database, the created table including a declaration of metadata that expresses the relationship between the table being created and at least one other database entity of the relational database;
   receive, expressed in the database language, a query statement including a reference to the created table defined to include the association expressing the relationship between the created table and the at least one other database entity, the query statement not explicitly stating the association defined by the forward-declared JOIN statement;
   defining a database view in the relational database, using a second database language statement, the second database language statement including a statement to create the view and a forward-declared JOIN statement that specifies a name for the view and defines a relationship between the view and at least one other entity two entities of the relational database; and
   execute the query statement to generate a query result, the query result generated based on the metadata declared at the creation of the table that expresses the relationship between the created table and the at least one other database entity of the relational database.

6. The system of claim 5, wherein the metadata is stored in a catalog of the database.

7. The system of claim 5, wherein the at one other database entity of the relational database includes a database table.

8. The system of claim 7, wherein the at least one other database entity of the relational database includes at least one of a database table, a database view, and combinations thereof.

9. A non-transitory computer-readable medium storing processor executable instructions, the medium comprising:
   instructions to receive user inputs to define a database table in a relational database using a database language statement, the database language statement including a statement to create the table and a forward-declared JOIN statement that specifies a name for the table and defines, at a level of the table within the table, an association expressing a relationship between the table being created and at least one other entity of the relational database;
   instruction to create the table including the forward-declared JOIN statement in the relational database, the created table including a declaration of metadata that expresses the relationship between the table being created and at least one other database entity of the relational database;
   instructions to receive, expressed in the database language, a query statement including a reference to the created table defined to include the association expressing the relationship between the created table and the at least one other database entity, the query statement not explicitly stating the association defined by the forward-declared JOIN statement;
   instructions to define a database view in the relational database, using a second database language statement, the second database language statement including a statement to create the view and a forward-declared JOIN statement that specifies a name for the view and defines a relationship between the view and at least one other entity two entities of the relational database; and instructions to execute the query statement to generate a query result, the query result generated based on the metadata declared at the creation of the table that expresses the relationship between the created table and the at least one other database entity of the relational database.

10. The medium of claim 9, wherein the metadata is stored in a catalog of the database.

11. The medium of claim 9, wherein the at one other database entity of the relational database includes a database table.

12. The medium of claim 11, wherein the one other database entity of the relational database includes at least one of a database table, a database view, and combinations thereof.

* * * * *